United States Patent [19]

Tallon et al.

[11] Patent Number: 4,715,897

[45] Date of Patent: Dec. 29, 1987

[54] ESTERS AS PITCH PLASTICIZERS

[75] Inventors: James A. Tallon, Grafton; Richard T. Lewis, Parma Heights, both of Ohio

[73] Assignee: Union Carbide Corporation, Danbury, Conn.

[21] Appl. No.: 862,695

[22] Filed: May 13, 1986

Related U.S. Application Data

[63] Continuation of Ser. No. 596,365, Apr. 3, 1984, abandoned.

[51] Int. Cl.$^4$ ............................................. C08L 95/00
[52] U.S. Cl. .................... 106/284; 252/510; 106/273 R
[58] Field of Search ............... 106/284, 273; 208/22, 208/44; 252/510

[56] References Cited

U.S. PATENT DOCUMENTS 2,884,391  4/1959  Winter et al. ............... 106/284
4,288,354  9/1981  Shiomoto ..................... 106/284

OTHER PUBLICATIONS

Kirk–Othmer: "Encyclopedia of Chemical Technology," vol. 18, John Wiley & Sons, Inc. (1982), pp. 111–177.

*Primary Examiner*—Amelia B. Yarbrough
*Attorney, Agent, or Firm*—J. L. Sonntag

[57] ABSTRACT

Benzenepolycarboxylic acid esters, preferably phthalate or isophthalate acid esters are used as plasticizers in carbon/pitch mixes used in the production of extruded carbon and graphite electrodes.

24 Claims, No Drawings

ESTERS AS PITCH PLASTICIZERS

This application is a continuation of prior U.S. application: Ser. No. 596,365 Filing Date Apr. 3, 1984 and which is an abandoned application.

FIELD OF THE INVENTION

The invention relates to carbon/pitch mixtures extruded into composite carbon bodies, which are then baked to produce carbon/graphite electrodes and the like. In particular the invention relates to an improved plasticizer used in the carbon/pitch mixture.

BACKGROUND OF THE INVENTION

In the manufacture of carbon and graphite electrodes, a premium-grade coke is typically mixed with a binder, such as coal tar pitch and extruded into cylindrical billets. Added to the mixture are optionally various extrusion aids to improve the rheological properties of the mix by acting as a plasticizer and/or to lubricate the surfaces of the extrusion equipment. Typically, the mixing occurs at a temperature of about 160° C. At this temperature, for optimum results, the pitch should have a softening point in the range of 95° C. to 100° C. Such a pitch can be provided by adjusting the conditions of the fractionation of the coal tar or petroleum from which the pitch is derived. However, in order to increase the coking value of the pitch (the fraction of the original material ultimately converted to carbon or graphite in the final baked product), it is often the practice to use a pitch with a higher softening point, for example 110° C., and add a pitch plasticizer to depress the softening point to the desired value.

Accordingly various plasticizing agents have been added to pitch. Materials that have been used as plasticizers are fatty acids, such as capric acid, lauric acid, myristic acid, palmitic acid, stearic acid, arachidic acid, behenic acid, oleic acid, linoleic acid, linolenic acid, eleostearic acid, and ricinoleic acid or mixtures thereof; as well as phenol, furfuryl alcohol, furfural, and various aromatic fractions derived from coal tar and petroleum.

After the mix is extruded, the resulting composites or green carbon bodies are baked to remove the volatile constituents and polymerize the remaining constituents to leave a substantially pure carbon body. Optionally the carbon body is further heated to convert the carbon into graphite. The properties of the baked carbon or graphite body are dependent on several factors. For example, contaminants and additives may contribute to an undesirable lowering of the density, as well as negatively influencing such properties as the coefficient of thermal expansion (CTE), the specific resistance (SR), or the strength.

It is desirable, therefore, that an additive not adversely affect these properties. For this reason it is an object of the invention to provide a plasticization additive for improving the extrusion of carbon/pitch mixtures, which does not adversely affect the physical properties of the graphite or carbon product.

SUMMARY OF THE INVENTION

An aspect of the invention is an improvement in a process for making a carbon body which comprises preparing a mixture including carbonaceous particles, pitch binders, and binder additives; extruding the mixture to prepare composite and thereafter baking the composite to form the carbon body, the improvement comprising the use of a benzenepolycarboxylic acid ester soluble in the pitch as a plasticizing agent in the mixture. The benzenepolycarboxylic acid esters useful in the invention have the structure:

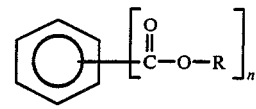

wherein n is a number between 2 and 6, and wherein the R groups ae the same or different from each other and each is a substituted or unsubstituted alkyl, alkenyl, or aryl group having 1 to 20 carbon atoms. Each R group is preferably unsubstituted but may be optionally substituted with the permissible substituents being selected from the group of amino, hydroxy, halo, cyano, nitro, oximino, alkoxy, alkylthio, alkylsulfinyl, and alkylsulfonyl. Preferably n is 2, (phthalic, isophthalic, and terephthalic acid diesters) and the R groups are unsubstituted alkyl, alkenyl, or aryl with 1 to 10 carbon atoms. More preferably, the esters are phthalic or isophthalic acid diesters, and the R groups are unsubstituted alkyl, or alkenyl with 1 to 4 carbon atoms.

Another aspect of the invention is a mixture, and a composite extruded from the mixture, that comprise carbonaceous particles, pitch binder and the above defined benzenepolycarboxylic acid ester plasticizing agent.

In order to achieve the full advantage of the practice of the invention, the mixture should preferably contain a surfactant agent that prevents the mixture from adhering to the extrusion equipment during formation of the green carbon bodies. The adhering of the mixture to the extrusion equipment causes an undesirable rise in the extrusion pressure, which in turn leads to a decrease in the quality of the extruded product. The preferred surfactant agents are the fatty acids, listed above, which have been used as plasticizing agents. These include capric acid, lauric acid, myristic acid, palmitic acid, stearic acid, arachidic acid, behenic acid, oleic acid, linoleic acid, linolenic acid, eleostearic acid, and ricinoleic acid. The fatty acids with contribute some to the plasticizing effect, but will principally act as a surfactant agent, with the polycarboxylic acid esters contributing mostly the to the plasticizing of the mixture.

Suprisingly it has been found by practice of the invention that not only is the carbon pitch mixture plasticized, but other unexpected benefits are realized.

The plasticizing abilities of the benzenepolycarboxylic acid esters of the invention can be demonstrated by measuring plasticizing efficiency by a softening point method and a glass transition temperature (Tg) method.

In Table A is shown plasticizing efficiencies for benzenepolycarboxylic acid esters of the invention and stearic acid using glass transition temperature data. The plasticizing efficiency values were obtained by dividing the depression of the glass transition temperature of the pitch in Celsius by the weight percent of the plasticizer in the mixture. The pitch glass transition temperatures were measured using the Differential Scanning Calorimeter (DSC) method described by J. B. Barr and I. C. Lewis, Thermochimica Acta, 52 (1982), 297. The pitch was a commercial coal tar pitch having a softening point of 110° C.

TABLE A

| | DSC Tg Plasticizer Efficiencies | |
|---|---|---|
| Plasticizer | | Efficiency (°C./wt. %) |
| Stearic Acid | | 3.2 |
| Dibutyl phthalate | | 4.4 |
| Diallyl isophthalate | | 3.8 |
| Diisobutyl phthalate | | 3.6 |
| Diphenyl phthalate | | 2.3 |

In Table B are shown plasticizer efficiencies for benzenepolycarboxylic acid esters and stearic acid which were calculated using softening point measurements. The plasticizing efficiency values were obtained by dividing the depression of the softening point temperature of the pitch in Celsius by the weight percent of the plasticizer in the mixture. The pitch softening point temperatures were measured using the Mettler method (ASTM No. D-3104-77). The pitch used was the same as in Table A. The plasticizers tested and the corresponding softening point temperatures, and plasticizing efficiency values are shown in Table B.

TABLE B

| | SP Plasticizer Efficiencies | | |
|---|---|---|---|
| Plasticizer | Conc. (pph) | SP (°C.) | Eff. (°C./wt. %) |
| None | 0 | 110.1 | — |
| Stearic Acid (StA) | 3.57 | 100.1 | 2.9 |
| StA | 3.57 | 99.3 | 3.1 |
| Dibutyl phthalate | 3.5 | 97.4 | 3.8 |
| Dibutyl phthalate/StA | 3.0/0.5 | 98.5 | 3.4 |
| Dimethyl phthalate | 3.55 | 101.1 | 2.6 |
| Dipropyl phthalate | 3.53 | 99.4 | 3.1 |

Although, the data shown above in Tables A and B for the two methods give slightly different results, they do demonstrate benzenepolycarboxylic acid esters having plasticizing ability comparable to stearic acid.

As shown in Tables A and B above, benzenepolycarboxylic acid esters have comparable or superior plasticizing ability. The fact that benzenepolycarboxylic acid esters have plasticizing ability is significant in itself, and would indicate the possible usefulness of these esters in the extrusion of carbon bodies. But, what is particularly advantageous and unexpected, and is not evident from the plasticizing efficiency or from any teaching in the prior art, is that when benzenepolycarboxylic acid esters are used, it is possible to lower the mixing temperature of the carbon-pitch mixture without further modification of the mixing process. The lower mixing temperature leads to other significant advantages. The lower mixing temperature generally produces a mix in combination with a surfactant agent that can be extruded at a lower pressure. The lower extrusion pressure generally results in an increased density of the extruded green carbon body, which in turn is reflected in a corresponding increase in the density of the baked carbon or graphite body. Furthermore, the lower mixing temperature also allows greater flexibility in the mixing process. For example, at the lower mixing temperature, a lesser amount of pitch can be used, thus increasing the coking value of the mixture and facilitating baking. Thus, by practice of the invention, process advantages and superior properties of the product are obtained without a major or costly change in the process of manufacture. Without the use of the benzenepolycarboxylic acid esters used in the invention, a lower mixing temperature is usually achievable only with modifications to the mixing process, and often at the cost of a loss in quality of the final carbon artifact.

It is not known why it is possible to mix at the reduced temperature by practice of the invention, as compared to the prior art plasticizer systems. The change in mixing temperature might indicate a change in the temperature viscosity relationship of the mix. However, compared on a equivalent softening point basis, there are no significant differences in viscosity-temperature behavior between a pitch plasticized with stearic acid and a pitch plasticized with 85 wt.% dibutyl phthalate, and 15 wt.% stearic acid. It would be expected that in light of these equivalent temperature/viscosity properties, there would be no significant difference in the mixing properties, since it generally believed that the mixing properties depend largely on the viscosity of the plasticized pitch at the mixing temperature. But unexpectedly, by practice of the invention there is not only improvement in the plasticizing efficiency, but also a depression in the possible mixing temperature.

In typical industry practice, carbon, a pitch having a soften point of about 110° C., a plasticizer, and optional extrusion aids are mixed at a temperature of about 160° C. By practice of the invention the mixing temperature can be over a range from about 130° C. to about 160° C. As discussed above, this broader range of mix temperatures allows for considerable latitude in mixing. At the lower mix temperatures, a substantially lower extrusion pressure is obtained. This lower extrusion pressure usually gives about a 0.01 gm/cc increase in the density of the extruded green carbon body. Furthermore, as discussed above, the lower extrusion pressure allows one the option of reducing the pitch binder level which in turn results in an improved structure of the baked carbon or graphite body. Any improvement in the physical properties will lead to ultimate improvements in the final graphite electrode, which in turn should lead to improved performance in actual use of the electrode.

Other advantages often accrue by practice of the invention. For example, the final carbon or graphite artifact often has improved properties, such as a higher density, a lower SR, and higher flexure strength. It is unexpected than the benzenepolycarboxylic acid esters of the invention while acting as plasticizing agents, and lowering the mixing temperature, do not at the same time adversely effect the physical properties of the final carbon/graphite product, but actually, in some cases, improve these properties.

Another advantage of certain of the preferred phthalate ester plasticizers of the invention, in particular dibutyl phthalate, is that they have increased solubility in "heat-treated" coal tar pitches, compared to prior art fatty acid plasticizers. Heat-treated coal tar pitches are defined here as pitches which are given sufficient additional heat treatment to induce polymerization and increase their coking value, during or after their initial production by fractionation of petroleum residues or coal tars. The prior art fatty acid plasticizers are only partially soluble in these pitches at typical additive levels, which prohibits a sufficient concentration to adequately plasticize the pitch. However, it has been found that the above phthalate esters are sufficiently soluble in heat-treated pitches to plasticize the pitch to an adequate extent.

DESCRIPTION OF THE INVENTION

The plasticizers of the invention are the benzenepolycarboxylic acid esters defined above. The esters found most effective as plasticizers and in lowering the mixing temperature are dibutyl phthalate, diallyl isophthalate, diethyl phthalate, and diisobutyl phthalate. The most preferred esters are dibutyl phthalate, diethyl phthalate and diallyl isophthalate.

The benzenepolycarboxylic acid esters should be soluble in the pitch. Preferably the benzenepolycarboxylic acid esters are not reactive with the constituents of the pitch and the other additives in the carbon-pitch mixture in the mixing process to the extent such that extrusion of the green carbon bodies or the properties of the baked carbon or graphite articfacts are adversely affected. The benzene ring may also have additional substituents other than the ester moieties, as long as they do not render the ester insoluble in the pitch, too reactive with the mixture constituents, or otherwise change the properties of the ester such that it interferes with mixing or extrusion process, and thereby deleteriously affects the quality of the final product.

The process of the invention is carried out by use of the benzenepolycarboxylic acid ester as the plasticizer in the carbon/pitch mixture. The plasticizer levels are typically about the same as if a prior art plasticizer had been used. For a pitch with a softening point of 110° C., sufficient plasticizer to reduce the softening point to between about 95° C. and 100° C. is typical. Typical concentrations are between about 1 wt.% and about 6 wt.%, preferably between about 2 wt.% and about 4 wt.%, based on the weight of the pitch. Since the preferred benzenepolycarboxylic esters, dibutyl phthalate, diethyl phthalate, and diallyl isophthalate, have superior plasticizing ability over conventional prior art plasticizers, optionally somewhat less plasticizer may be used to achieve the same plasticizing effect. Other plasticizers may be used in combination with the benzenepolycarboxylic acid ester with the total concentration of plasticizer being in the ranges discussed above.

As discussed above, the carbon pitch mixture also contains a surfactant agent. The preferred surfactant agent is one of the above fatty acids, which also acts as a plasticizer. In a typical practice of the invention, the total amount of plasticizer is in an amount cited in the above paragraph, with between 75 wt.% and 90 wt.%, preferably between 80 wt.% and 85 wt.%, of the total plasticizer being a benzenepolycarboxylic acid ester of the invention, and between about 10 wt.% and about 25 wt.%, preferably between about 15 wt.% and about 20 wt.% the fatty acid surfactant agent.

The pitch binders used in the process of the invention are the residues obtained in the distillation of coal tar after all the light oils, intermediate fractions and heavy oils have been distilled off, or residues obtained by distillation of various petroleum-derived materials, and include pitches currently used as binders in carbon/pitch mixtures.

The benzenepolycarboxylic acid ester is preferably added to the electrode mix at the beginning of the mix cycle, just after the initial mixing of the cold ingredients. Mixing is carried out for the conventional time used for prior art mixes in the particular mixer used. The mixing temperature for pitches having a softening point of about 110° C. is either about 160° C., or preferably reduced to a temperature of between about 130° C. and about 140° C. When pitches with a differing softening point are used, the mixing temperature can be changed accordingly. With the exceptions of a possibly reduced extrusion pressure and/or a reduced binder level, all further constituents and processing of the mix, and extrusion, baking and graphitization of the carbon rods may remain the same as if prior art plasticizers were used.

By practice of the invention, an easily accomplished and commercially acceptable modification to existing processes is made that results in the unexpected processing advantages and property improvements.

The invention will now be illustrated by the following examples, which are not intended to be limitive thereof.

In the following examples the physical properties of the green, carbon, and graphite bodies were measured according to established procedures. "WG" refers to properties measured with the grain, i.e. parallel to the axis of the cylindrical carbon body.

In the following examples DEP is diethyl phthalate, DBP is dibutyl phthalate, and DAIP is diallyl isophthalate. The term "6/3 coke particles" refers to screened coke particles having a nominal size between about 0.06 inches (1.5 mm) and 0.03 inches (0.76 mm). The term "3/1.5 coke particles" refers to screened coke particles having a nominal size between about 0.03 inches (0.76 mm) and 0.015 inches (0.38 mm). The term "55 flour" refers to coke particles all of which pass through a 35 mesh Tyler screen and 55 wt % of which pass through a 200 Tyler mesh screen. The pitch used was a pitch having a softening point of about 110° C. The softening point was measured using ASTM No. D-3104-77, "Softening Point of Pitches, Mettler Softening Point".

Near the end of the mixing cycle, prior to cooling the mixture for extrusion, an extrusion oil essentially insoluble in the pitch was added in an amount of 0.5 parts by weight to 100 parts of coke, as is disclosed in U.S. Pat. No. 4,307,052 to Gannon et al. Iron oxide ($Fe_2O_3$) was added to the mix formulation as a puffing inhibitor.

EXAMPLE I

Diallyl isophthalate was evaluated in carbon electrode mixes using a premium grade petroleum coke.

Three mixes, a control (IA) and two illustrating the invention (IB, and IC) were made, the formulations of which are shown in Table C. For formulations IA and IB the mix temperature was 160° C., for formulation IC, the mix temperature was 130° C.

TABLE C

| INGREDIENTS | MIX FORMULATIONS - I | | |
|---|---|---|---|
| | IA | IB | IC |
| | (weight-kg) | | |
| 6/3 coke particles | 3.09 | 3.09 | 3.09 |
| 3/1.5 coke particles | 1.54 | 1.54 | 1.54 |
| 55 flour | 3.76 | 3.76 | 3.76 |
| Iron Oxide | 0.18 | 0.18 | 0.18 |
| Hard Pitch | 2.54 | 2.54 | 2.36 |
| Stearic Acid | 0.086 | 0.014 | 0.014 |
| DAIP | 0 | 0.073 | 0.068 |

Each mix formulation underwent a conventional mix cycle of 60 minutes in a 2.5 gallon (9.5 liter) sigma-blade mixer at the indicated mix temperature and then was extruded in a conventional extrusion press into 2.5 inch (6.35 cm) diameter green carbon bodies. The green carbon bodies were baked by heating in a coke pack in an electric powered furnace at a rate of 2° C./hr. to 500° C., and then 10° C./hr. to 900° C. The resulting baked carbon bodies were then graphitized in an induction furnace in a coke pack by heating at a rate of 400° C./hr. to 2950° C. The resulting graphite electrode rods were tested by standard procedures. In Table D below are summarized the results.

TABLE D

| | Comparative Tests - I Properties | | |
|---|---|---|---|
| | IA | IB | IC |
| Extrusion Temperature (°C.) | ~106 | 106 | ~106 |
| Extrusion Pressure (Pa × $10^6$) | 1.4 | 1.7 | 1.3 |
| Green Density (g/cc) | 1.75 | 1.75 | 1.74 |
| Bake Density (g/cc) | 1.63 | 1.64 | 1.67 |
| Graphite Density (g/cc) | 1.59 | 1.60 | 1.67 |
| WG Graphite SR (microohms-meter) | 8.44 | 8.17 | 7.11 |
| WG Graphite Flex. Str. (Pa × $10^6$) | 9.96 | 9.72 | 12.68 |
| WG Graphite Mod (Pa × $10^9$) | 6.76 | 6.89 | 8.69 |
| WG Graphite CTE ($10^{-6}$/°C.) | 0.56 | 0.56 | 0.56 |

For formulation IB, of the invention, there was a slight improvement in the density of the baked and graphitized carbon bodies over the control formulation IA. For formulation IC, of the invention, wherein there was a lower mixing temperature of the mix, there was an improvement found in all the properties of Table B. This example shows how by practice of the invention, improvement in the properties of the graphite body can be achieved, as well as a reduction of the mixing temperature and extrusion pressure as shown for formulation IC. Also shown for IC, is a desirable lower concentration of pitch binder.

EXAMPLE II

Dibutyl phthalate was evaluated in an electrode mixture using the same coke as Example I. The tests used the following formulations, IID, a control formulation, and IIE, IIF, made according to the invention. The mix temperature for IID, IIE was 160° C. The mix temperature for IIF was 130° C.

TABLE E

| | MIX FORMULATIONS - II | | |
|---|---|---|---|
| INGREDIENTS | IID | IIE (weight-kg) | IIF |
| 6/3 coke particles | 3.09 | 3.09 | 3.09 |
| 3/1.5 coke particles | 1.54 | 1.54 | 1.54 |
| 55 flour | 3.76 | 3.76 | 3.76 |
| Iron Oxide | 0.18 | 0.18 | 0.18 |
| Hard Pitch | 2.54 | 2.54 | 2.36 |
| Stearic Acid | 0.086 | 0.014 | 0.014 |
| DBP | 0 | 0.073 | 0.068 |

These mix formulations underwent a conventional mix cycle of 60 minutes in a 2.5 gallon (9.5 liter) sigma-blade mixer at the indicated mix temperature and then were extruded in a press, as in Example I. The carbon bodies were baked and graphitized in the same manner described in Example I. The following properties were noted for these mixes:

TABLE F

| | Comparative Tests - II Properties | | |
|---|---|---|---|
| | IID | IIE | IIF |
| Extrusion Temperature (°C.) | 107 | 108 | 108 |
| Extrusion Pressure (Pa × $10^6$) | 2.1 | 2.1 | 1.4 |
| Green Density (g/cc) | 1.74 | 1.76 | 1.75 |
| Bake Density (g/cc) | 1.65 | 1.67 | 1.69 |
| Graphite Density (g/cc) | 1.60 | 1.64 | 1.66 |
| WG Graphite SR (microohms-meter) | 8.20 | 7.30 | 6.90 |
| WG Graphite Flex. Str. (Pa × $10^6$) | 12.48 | 13.92 | 14.89 |
| WG Graphite Mod (Pa × $10^9$) | 7.58 | 8.27 | 9.65 |
| WG Graphite CTE ($10^{-6}$/°C.) | 0.40 | 0.40 | 0.40 |

A very desirable increase of 0.04 g/cc or more in graphite density is shown by practice of the invention, as demonstrated by comparing control formulation IID with formulations IIE and IIF of the invention. Also shown is a significant decrease in extrusion pressure and a decrease in the concentration of the pitch binder for formulation IIF.

EXAMPLE III

Diethyl phthalate was evaluated by making electrodes with the coke of Example II. The tests used the following formulations, IIID, a control formulation (same as IID above), and IIIG, IIIH, according to the invention. The mix temperature for IIIG and IIID was 160° C. The mix temperature for IIIH was 130° C.

TABLE G

| | MIX FORMULATIONS - III | | |
|---|---|---|---|
| INGREDIENTS | IIID | IIIG (weight-kg) | IIIH |
| 6/3 coke particles | 3.09 | 3.09 | 3.09 |
| 3/1.5 coke particles | 1.54 | 1.54 | 1.54 |
| 55 flour | 3.76 | 3.76 | 3.76 |
| Iron Oxide | 0.18 | 0.18 | 0.18 |
| Hard Pitch | 2.54 | 2.54 | 2.36 |
| Stearic Acid | 0.086 | 0.014 | 0.014 |
| DEP | 0 | 0.073 | 0.068 |

These mix formulations underwent a standard mix cycle of 60 minutes in a 2.5 gallon (9.5 liter) sigma-blade mixer at the indicated mix temperature and then were extruded into 2.5 inch (6.4 cm) diameter billets in a press as in Example I. The resulting carbon bodies were baked and graphitized in the same manner described in Example I. The following properties were noted for these formulations;

TABLE H

| | Comparative Tests - III Properties | | |
|---|---|---|---|
| | IIID | IIIG | IIIH |
| Extrusion Temperature (°C.) | 107 | 104 | 105 |
| Extrusion Pressure (Pa × $10^6$) | 2.1 | 2.1 | 1.4 |
| Green Density (g/cc) | 1.74 | 1.74 | 1.75 |
| Bake Density (g/cc) | 1.65 | 1.66 | 1.68 |
| Graphite Density (g/cc) | 1.60 | 1.61 | 1.65 |
| WG Graphite SR (microohms-meter) | 8.20 | 7.40 | 7.20 |
| WG Graphite Flex. Str. (Pa × $10^6$) | 12.48 | 12.96 | 14.06 |
| WG Graphite Mod (Pa × $10^9$) | 7.58 | 8.96 | 8.96 |
| WG Graphite CTE ($10^{-6}$/C.) | 0.40 | 0.40 | 0.40 |

For the formulations according to the invention (IIIG, IIIH), an increase of 0.01 to 0.05 g/cc in graphite density was achieved. For formulation IIIH there was a substantial decrease in extrusion pressure and a decrease in the concentration of pitch binder used.

EXAMPLE IV

Diallyl isophthalate was evaluated by making electrodes with a commercial grade premium coke. The tests used the following formulations, IVI, a control formulation, and IVJ, IVK, made according to the invention, shown below in Table G. The mix temperature for IVI was 160° C. The mix temperature for IVJ and IVK was 140° C.

TABLE I

| MIX FORMULATIONS - IV | | | |
|---|---|---|---|
| INGREDIENTS | IVI | IVJ | IVK |
| | | (weight-kg) | |
| 6/3 Coke particles | 50.3 | 50.3 | 50.3 |
| 3/1.5 coke particles | 24.5 | 24.5 | 24.5 |
| 55 flour | 61.2 | 61.2 | 61.2 |
| Iron Oxide | 2.7 | 2.7 | 2.7 |
| Hard Pitch | 40.8 | 40.8 | 38.1 |
| Stearic Acid | 1.4 | 0.23 | 0.23 |
| DAIP | 0 | 1.18 | 1.09 |

These mix formulations underwent a conventional mix cycle of 70 minutes in a 500 pound (227 kilogram) capacity cylinder mixer at the indicated mix temperature and then were extruded in a conventional extrusion press into 6 inch (15.2 cm) diameter carbon bodies. The carbon bodies were baked and graphitized in the same manner described in Example I. The following properties were noted for these mixes:

TABLE J

| Comparative Tests - IV | | | |
|---|---|---|---|
| Properties | IVI | IVJ | IVK |
| Extrusion Temperature (°C.) | 106 | 105-6 | 103 |
| Extrusion Pressure (Pa × $10^6$) | 2.1 | 2.1 | 1.4 |
| Green Density (g/cc) | 1.75 | 1.76 | 1.76 |
| Bake Density (g/cc) | 1.64 | 1.67 | 1.65 |
| WG Graphite Density (g/cc) | 1.59 | 1.63 | 1.63 |
| WG Graphite SR (microohms meter) | 7.40 | 6.70 | 6.60 |
| WG Graphite Flex. Str. (Pa × $10^6$) | 7.38 | 9.44 | 8.96 |
| WG Graphite Mod (Pa × $10^9$) | 6.20 | 7.58 | 7.58 |
| WG Graphite CTE ($10^{-6}$/°C.) | 0.70 | 0.70 | 0.60 |

For the formulations according to the invention (IVJ, IVK), an increase of 0.04 g/cc in graphite density was achieved. For formulation IVK is shown a decrease in extrusion pressure and a decrease in the concentration of the pitch binder used.

EXAMPLE V

Dibutyl phthalate was evaluated by making electrodes with a commercial grade premium coke. The tests used the following formulations, VL, a control formulation, and VM, VN, made according to the invention, shown below in Table I. The mix temperature for VL was 160° C. The mix temperature for VM and VN was 140° C.

TABLE K

| MIX FORMULATIONS - V | | | |
|---|---|---|---|
| INGREDIENTS | VL | VM | VN |
| | | (weight-kg) | |
| 6/3 Coke particles | 50.3 | 50.3 | 50.3 |
| 3/1.5 coke particles | 24.5 | 24.5 | 24.5 |
| 55 flour | 61.2 | 61.2 | 61.2 |
| Iron Oxide | 2.7 | 2.7 | 2.7 |
| Hard Pitch | 40.8 | 40.8 | 38.1 |
| Stearic Acid | 1.4 | 0.23 | 0.23 |
| DAIP | 0 | 1.18 | 1.09 |

These mix formulations underwent a standard mix cycle of 70 minutes in a 500 pound (227 kilogram) capacity cylinder mixer at the indicated mix temperature and then were extruded in a conventional extrusion press into 6 inch (15.2 cm) diameter carbon bodies. The carbon bodies were baked and graphitized in the same manner described in Example I. The following properties were noted for these mixes:

TABLE L

| Comparative Tests - V | | | |
|---|---|---|---|
| Properties | VL | VM | VN |
| Extrusion Temperature (°C.) | 107 | 108 | 109 |
| Extrusion Pressure (Pa × $10^6$) | 2.9 | 2.0 | 2.9 |
| Green Density (g/cc) | 1.76 | 1.78 | 1.77 |
| Bake Density (g/cc) | 1.65 | 1.69 | 1.68 |
| Graphite Density (g/cc) | 1.60 | 1.64 | 1.63 |
| WG Graphite SR (microohms meter) | 6.50 | 5.70 | 6.90 |
| WG Graphite Flex. Str. (Pa × $10^6$) | 8.96 | 10.27 | 10.06 |
| WG Graphite Mod (Pa × $10^9$) | 7.58 | 8.27 | 8.27 |
| WG Graphite CTE ($10^{-6}$/°C.) | 0.60 | 0.60 | 0.50 |

For the formulations according to the invention, an increase of 0.03 to 0.04 g/cc in graphite density was achieved. There was also shown improvement in all the properties except the CTE. For formulation VM is shown a lower extrusion pressure. Formulation VN shows the use of a lower concentration of binder and a lower mix temperature.

What is claimed is:

1. A process for making a carbon body which comprises; (a) providing a mixture comprising carbonaceous particles, pitch binder, and a plasticizing agent in an amount between about 1 and about 6 wt.%, based on the weight of the pitch binder; (b) extruding the mixture to prepare extruded composite, and (c) baking the composite to form the carbon body, wherein the plasticizing agent is benzenepolycarboxylic acid ester soluble in the pitch binder and having the structure;

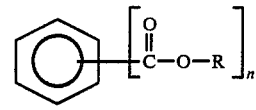

wherein n is between 2 and 6, and wherein each R is the same or different from the other R groups, and each R is a substituted or unsubstituted alkyl, alkenyl, or aryl group having 1 to 10 carbon atoms, wherein the permissible substituents on the R groups are selected from the groups of amino, hydroxy, halo, cyano, nitro, oximino, alkoxy, alkylthio, alkylsulfinyl and alkylsulfonyl.

2. The process of claim 1 wherein R is an unsubstituted alkyl, alkenyl, or aryl group having 1 to 10 carbon atoms.

3. The process of claim 2 wherein R is an unsubstituted alkyl, or alkenyl group having 1 to 4 carbon atoms.

4. The process of claims 1, 2 or 3 wherein n is 2.

5. The process of claim 4 wherein the ester is a phthalic or isophthalic diester.

6. The process of claim 1 wherein the benzenepolycarboxylic acid ester is dibutyl phthalate, diallyl isophthalate, diethyl phthalate, dimethyl phthalate, dipropyl phthalate, or diisobutyl phthalate.

7. The process of claim 1 wherein the benzenepolycarboxylic acid ester is dibutyl phthalate, or diallyl isophthalate.

8. The process of claim 1 wherein the plasticizing agent additionally comprises a fatty acid.

9. The process of claim 8 wherein the plasticizing agent comprises between about 75 wt.% and about 90 wt.% of the benzenepolycarboxylic acid ester and between about 10 wt.% and 25 wt.% of the fatty acid, based on the total amount of plasticizer.

10. The process of claim 9 wherein the plasticizing agent comprises between about 80 wt.% and about 85 wt.% of the benzenepolycarboxylic acid ester and between about 15 wt.% and 20 wt.% of the fatty acid, based on the total amount of plasticizer.

11. A mixture used for extruding carbon bodies comprising carbonaceous particles, a coal tar or petroleum pitch binder and between about 1 wt.% and about 6 wt.%, based on the weight of the pitch, of a plasticizing agent soluble in the pitch binder, said plasticizing agent comprising a benzenepolycarboxylic acid ester having the structure;

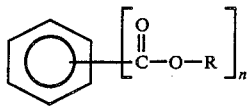

wherein n is between 2 and 6, and wherein each R is the same or different from the other R groups, and each R is a substituted or unsubstituted alkyl, alkenyl, or aryl group having 1 to 10 carbon atoms, wherein the permissible substituents on the R groups are selected from the group of amino, hydroxy, halo, cyano, nitro, oximino, alkoxy, alkylthio, alkylsulfinyl and alkylsulfonyl.

12. The mixture of claim 1 wherein R is an unsubstituted alkyl, alkenyl, or aryl group having 1 to 10 carbon atoms.

13. The mixture of claim 12 wherein R is an unsubstituted alkyl, or alkenyl group having 1 to 4 carbon atoms.

14. The mixture of claims 11, 12 or 13 wherein n is 2.

15. The mixture of claim 14 wherein the ester is a phthalate or isophthalate diester.

16. The mixture of claim 11 wherein the benzenepolycarboxylic acid ester is dibutyl phthalate, diallyl isophthalate, diethyl phthalate, dimethyl phthalate, dipropyl phthalate, or diisobutyl phthalate.

17. The mixture of claim 11 wherein the benzenepolycarboxylic acid ester is dibutyl phthalate, or diallyl isophthalate.

18. The mixture of claim 11 wherein the plasticizing agent additionally comprises a fatty acid.

19. The mixture of claim 18 wherein the plasticizing agent comprises between about 75 wt.% and about 90 wt.% of the benzenepolycarboxylic acid ester and between about 10 wt.% and 25 wt.% of the fatty acid, based on the total amount of plasticizer.

20. The mixture of claim 9 wherein the plasticizing agent comprises between about 80 wt.% and about 85 wt.% of the benzenepolycarboxylic acid ester and between about 15 wt.% and 20 wt.% of the fatty acid, based on the total amount of plasticizer.

21. A composite produced by extruding the mixture of claim 11.

22. A mixture used for extruding carbon bodies comprising carbonaceous coke particles, a coal tar or petroleum pitch binder and a plasticizing agent soluble in the pitch binder, said plasticizing agent comprising a benzenepolycarboxylic acid ester and a fatty acid, said benzenepolycarboxylic acid ester having the structure;

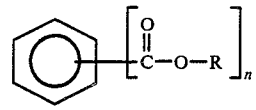

wherein n is between 2 and 6, and wherein each R is the same or different from the other R groups, and each R is a substituted or unsubstituted alkyl, alkenyl, or aryl group having 1 to 10 carbon atoms, wherein the permissible substituents on the R groups are selected from the group of amino, hydroxy, halo, cyano, nitro, oximino, alkoxy, alkylthio, alkylsulfinyl and alkylsulfonyl, said plasticizing agent being present in amounts ranging between about 1 wt. % and about 6 wt. %, based on the weight of said pitch, said mixture being characterized by a reduction of the softening point of said pitch to below 110° C. and by a reduction of the mixing temperature to within the range of between about 130° C. and 140° C.

23. A mixture used for extruding carbon bodies comprising carbonaceous coke particles, a coal tar or petroleum pitch binder and a plasticizing agent soluble in the pitch binder, said plasticizing agent comprising between about 75 wt. % and about 90 wt. % of a benzenepolycarboxylic acid ester and between about 10 wt. % and about 25 wt. % of a fatty acid, based on the total amount of said plasicizer, said benzenepolycarboxylic acid ester being selected from the group consisting of dibutyl phthalate, diallyl isophthalate, diethyl phthalate, dimethyl phthalate, dipropyl phthalate and diisobutyl phthalate, said plasticizing agent being present in amounts ranging between about 1 wt. % and about 6 wt. %, based on the weight of said pitch, said mixture being characterized by a reduction of the softening point of said pitch to below 110° C. and by a reduction of the mixing temperature to within the range of between about 130° C. and 140° C.

24. The mixture of claim 23 wherein the fatty acid is selected from the group consisting of capric acid, lauric acid, myristic acid, palmitic acid, stearic acid, arachidic acid, behenic acid, oleic acid, linoleic acid, eleostearic acid and ricinoleic acid.

* * * * *

UNITED STATES PATENT AND TRADEMARK OFFICE
CERTIFICATE OF CORRECTION

PATENT NO. : 4,715,897

DATED : December 29, 1987

INVENTOR(S) : Tallon et al.

It is certified that error appears in the above-identified patent and that said Letters Patent is hereby corrected as shown below:

at col. 2, line 13 "ae" should be -- are --;

at col. 2, line 49 the word "the" between "mostly" and "to" should be deleted;

at col. 11, line 35 "claim 1" should be -- claim 11 --; and at col. 12, line 1 "claim 9" should be -- claim 19 --.

Signed and Sealed this

Twentieth Day of June, 1989

Attest:

DONALD J. QUIGG

*Attesting Officer*   *Commissioner of Patents and Trademarks*